Sept. 19, 1939.  R. T. JESTER  2,173,536
HOBBYHORSE
Filed July 1, 1938
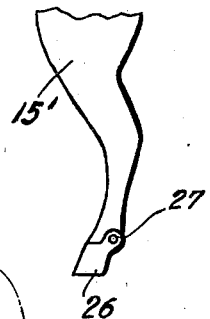
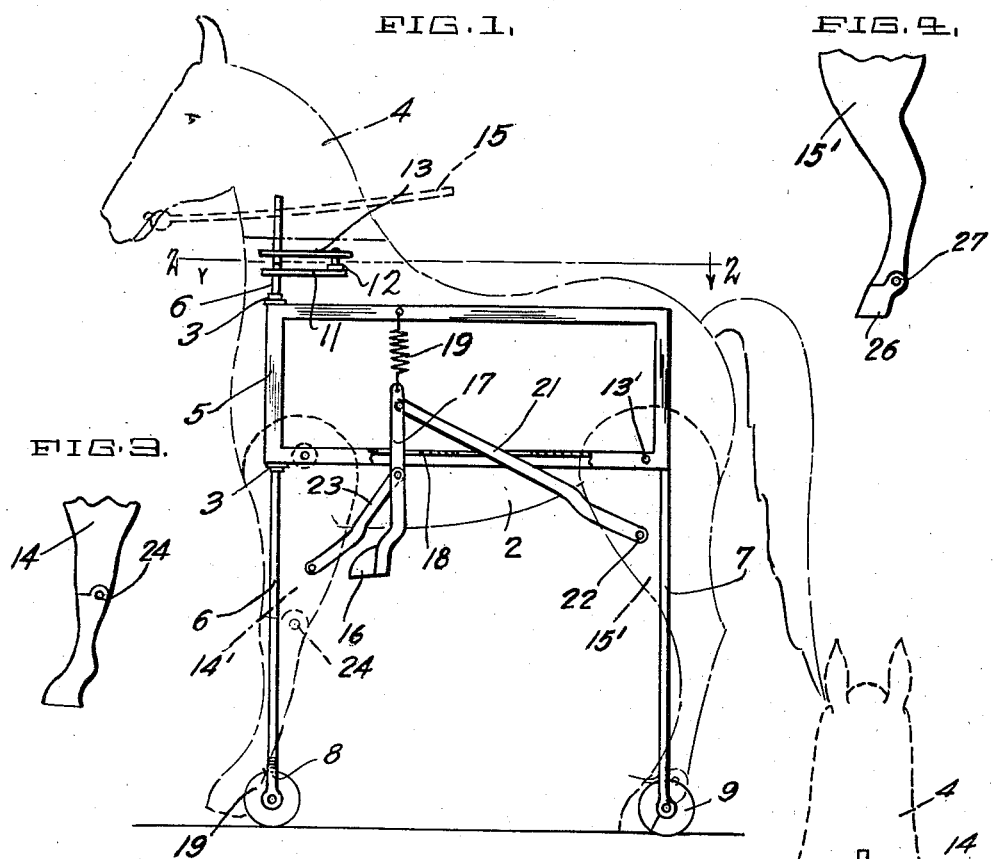
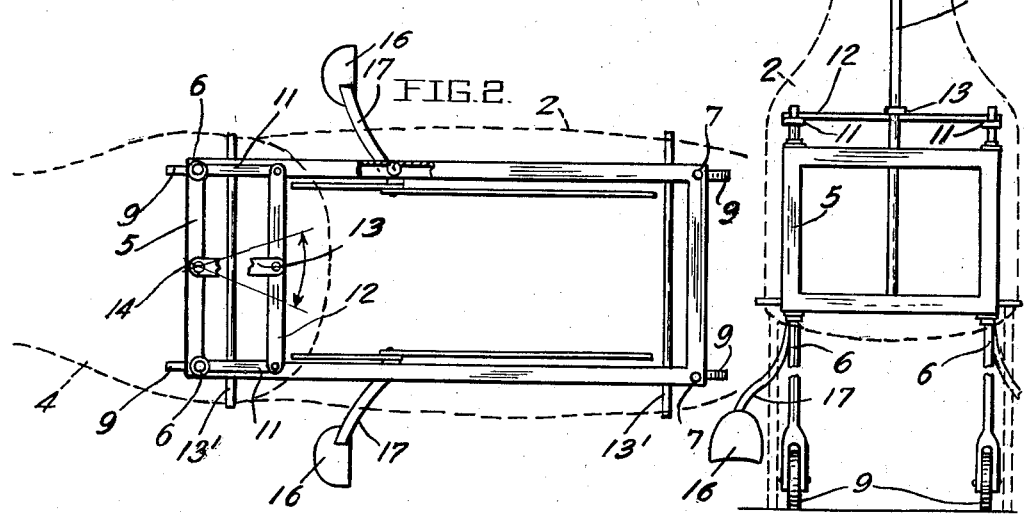
INVENTOR.
RALPH T. JESTER.
BY Victor J Evans & Co
ATTORNEYS.

Patented Sept. 19, 1939

2,173,536

UNITED STATES PATENT OFFICE 2,173,536

HOBBYHORSE

Ralph Thomas Jester, Hollywood, Calif.

Application July 1, 1938, Serial No. 217,018

2 Claims. (Cl. 272—53)

This invention relates to improvements in toys and has particular reference to a mechanical hobby horse which children may ride, which horse will simulate the movements of an animal.

A further object is to produce a device of this character which is relatively simple in construction, economical to manufacture, and safe for riding.

Other objects and advantages will be apparent during the course of the following description.

In the accompanying drawing forming a part of this specification and in which like numerals are employed to designate like parts throughout the same, Fig. 1 is a side elevation of the mechanism of my device and showing in dotted lines the outline of an animal;

Fig. 2 is a cross sectional view taken approximately on the line 2—2 of Fig. 1;

Fig. 3 is a fragmentary view of the front foot and leg of the animal;

Fig. 4 is a fragmentary view of the rear foot and leg of the animal; and

Fig. 5 is a front elevation of Fig. 1.

It has been the common practice to make toys simulating the configuration of different animals, which toys are usually used by children for riding purposes. Applicant has devised a hobby horse whereby the animal may be ridden in such a manner that the same will have a gait resembling the gait of a horse or like animal moving over the ground.

In the accompanying drawing, wherein for the purpose of illustration, is shown a preferred embodiment of my invention, the numeral 5 designates a box like frame work which forms the chassis upon which the body 2 of the animal is mounted, and the body which is shown in broken lines completely houses the chassis. Rotatably mounted in bearings 3 secured to the front corners of the chassis are vertical rods 6 and fixed to the rear corners are vertical rods 7. These rods 6 and 7 are forked as shown at 8 and are provided with wheels 9 journaled in the forks.

In order to steer the front wheels 9 the head section 4 is pivotally mounted on the body and the upper ends of the rods 6 are connected through linkage 11 pivoted to the ends of a cross member 12 which has pivotally connected thereto between its ends a link 13 fixed to the head stud 14, the latter being fixed to and within the head section and mounted for rotation in the front cross members of the chassis, as best shown in Figure 2. Therefore, it will be seen that when the rider pulls upon the reins 15 that are secured to the mouth portion of the head section, rotation of the latter will bring about steering movement of the front wheels 9.

Secured to and extending through the lower longitudinal members of the chassis adjacent to the ends thereof are shafts 13 having pivotally mounted on their outer ends, the front and rear legs 14' and 15' respectively.

In order to give motion to the legs I provide a driving mechanism on each side of the chassis and each mechanism consists of a stirrup 16 hung by a lever 17 passing through a slot 18 in the chassis and having its upper end secured to a spring 19, which is in turn secured to the chasis 5. Links 21 extend from the upper end of the levers 17, to which they are pivoted, downwardly and rearwardly and are pivoted at 22 to the rear legs at some point below the pivotal connection of the legs to their shaft 13'. Links 23 extend forwardly and downwardly from the levers 17 and connect to the front legs at a point below the pivots of the latter.

In Fig. 3 I have shown the lower portion of a front leg pivoted at 24, so that as the upper part of the leg moves about its arc, the lower part will bend, thus simulating the horse's leg bending at the knee joint.

In Fig. 4 I have shown the hoof 26 of a rear leg pivoted as at 27 to the lower end thereof and the rear legs are of a length, so that the hoofs engage the ground for propelling the toy. The result is that when a rider sits upon the body and moves the stirrups on opposite sides of the animal downwardly either simultaneously or alternately, the rear legs will be moved backwardly, and the hoofs 26 will exert a push on the ground for moving the toy forwardly. Upon the return movement of the rear legs by the springs 19, the hoofs will pivot about the pivot 27, so as to allow free forward movement of the rear legs. At the same time, the front legs will execute their movement in a very realistic manner due to the pivots 24, and the front legs are of a length to clear the ground throughout the entire length of the arc of their movement.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a device of the character described comprising a chassis frame having wheeled supports, a body portion mounted upon said frame and simulating an animal, said body portion having hinged front and rear legs and hinged hoofs mounted on the extremities of the rear legs thereof, means for propelling said chassis comprising spring suspended stirrup levers mounted on opposite sides of the chassis, links connected to said stirrup levers and to the front legs of the animal body, and additional links connected to said stirrup levers and to the rear legs of the animal body, whereby when downward pressure is applied to the stirrups the links connecting the front and the rear legs of the animal will cause the body to simulate the galloping movement of an animal, the motion of the rear legs tending to propel the device.

2. In a device of the class described as claimed in claim 1 said hinged hoofs mounted at the extremities of the rear legs being capable of contacting the ground, whereby the chassis may be propelled in either direction, and means carried by the head section of the animal body for steering the device.

RALPH THOMAS JESTER.